United States Patent [19]
Pallagi

[11] 3,941,556
[45] Mar. 2, 1976

[54] GAS CONTROL SYSTEM FOR A SANITARY LANDFILL

[76] Inventor: Frank Pallagi, 97-05 55th Ave., Elmhurst, N.Y. 11368

[22] Filed: Jan. 8, 1975

[21] Appl. No.: 539,284

[52] U.S. Cl. .............................. 431/202; 110/8 R
[51] Int. Cl.² ...................................... F23D 11/00
[58] Field of Search .................... 431/202; 110/7, 8

[56] References Cited
UNITED STATES PATENTS

| | | | |
|---|---|---|---|
| 3,525,674 | 8/1970 | Barnebey | 110/8 X |
| 3,822,983 | 7/1974 | Proctor et al. | 431/202 |

*Primary Examiner*—Edward G. Favors
*Attorney, Agent, or Firm*—Brumbaugh, Graves, Donohue & Raymond

[57] ABSTRACT

A system for controlling gas migration in a landfill including a gas permeable medium disposed in the trenches constructed for utility pipes to provide horizontal conduits for the gases, and a gas permeable medium disposed around the manholes and/or catch basins communicating with the utility pipes to provide vertical conduits for the gases, the vertical gas conduits communicating with the horizontal gas conduits so as to prevent the gases from entering the utility pipes. The gases are vented to the atmosphere through the manhole covers and/or the catch basin grates by way of gas permeable wall segments disposed between the manhole/catch basin sidewalls and the pavement, or are vented through vertical pipes that extend through the pavement and communicate with the horizontal gas conduits. Alternatively, the gases may be conducted from the horizontal gas conduits to the cellars of adjacent buildings and used as a fuel for heating purposes.

17 Claims, 9 Drawing Figures

GAS CONTROL SYSTEM FOR A SANITARY LANDFILL

BACKGROUND OF THE INVENTION

This invention relates to a gas migration control system and, more particularly, to a system for controlling gas migration in a sanitary landfill.

It is a common practice in developing a land area to construct a landfill, the landfill generally being formed from garbage, refuse, and the like. In such a sanitary landfill, decomposition gases are generated, which typically comprise largely carbon dioxide and methane, although other odorous gases such as hydrogen sulfide may also be generated. Methane is a colorless, odorless gas that is explosive in concentrations of 5 – 15%, and so provision must be made for dissipating these gases, inasmuch as they are generated by a sanitary landfill for many years. These gases are also generated by marsh deposits such as organic silt and peat, upon which the landfill is often placed.

If the decomposition gases are not properly removed from the landfill, methane gas may accumulate in explosive concentrations in sewer lines and beneath or within buildings located not only in or above the landfill, but also adjacent thereto, inasmuch as methane will migrate laterally from the landfill if the material adjacent thereto is more permeable than the material covering the landfill.

Among the efforts that have been made to control gas migration in a landfill has been the construction of one or more wells or shafts in or adjacent to a landfill, the decomposition gases being withdrawn by one or more exhaust blowers. Activated carbon filters have been employed to remove odors from the gases discharged by the blowers, but such filters do not absorb methane. In addition, incinerators have been installed to burn the methane and the odorous gases, natural gas being supplied as a pilot if the concentration of methane is too low to support combustion.

Gravel-filled trenches have also been constructed, the trenches generally extending below the landfill in an attempt to intercept all lateral gas flow. Where a relatively impermeable top cover, such as clay or pavement, overlies the landfill, a system of relatively shallow gravel-filled trenches has been constructed at the top of the landfill, the gases being discharged through vertical pipes extending through the top cover and connected to perforated, lateral pipes in the trenches. In some instances the gases discharged from the vertical risers have been burned off.

A technique used to contain or block the decomposition gases has been to construct an impermeable barrier in the form of a liner or a wall adjacent to the landfill. Generally, a layer of clay 1 – 4 feet thick, for example, or a synthetic membrane has been used for such barrier.

If buildings are to be constructed over a landfill, the gases generated under the building slab could collect in sufficient quantities to cause a fire and/or an explosion. Furthermore, these gases could infiltrate into the building so as to create a hazardous condition there. In order to avoid such danger, subfloor ventilation systems have been constructed in order to dilute the decomposition gases with fresh air and to exhaust these gases before dangerous concentrations can accumulate. Such exhaust systems include a plurality of fresh air trenches vented to the atmosphere, connected to which are a plurality of perforated pipes imbedded in gravel-filled trenches extending beneath the building slab, the gravel-filled trenches being connected with exhaust fans by means of a plurality of imperforate exhaust ducts.

SUMMARY OF THE INVENTION

The above systems for controlling gas migration in a sanitary landfill are extremely costly and in part require frequent inspection and maintenance. The present invention overcomes these and other objectionable aspects of the prior art.

In accordance with the invention, the existing utility conduit systems are used for collecting, controlling and removing decomposition gases generated in a marsh land or sanitary landfill above which is an impermeable layer comprising buildings or paved areas, such as streets, parking lots, and the like. In particular, the trenches for the storm sewer and/or water pipelines are backed-filled so as to provide a layer of gravel or crushed stone between the utility line and the pavement, communication being provided in these trenches for vertical movement of the gases from the crushed stone bedding for the utility pipes to the crushed stone layer between the utility pipes and the pavement. The utility pipes being at the top of the landfill, the decomposition gases naturally move from the landfill into the crushed stone bedding. The excavations for catch basins and manholes are back-filled around such manholes and catch basins with crushed stone or gravel to promote the gas migration from the landfill into the utility pipe trenches. Furthermore, the gases migrating along the utility lines are vented to the atmosphere through the covers of the manholes and catch basins by way of the crushed stone jacket surrounding each manhole and catch basin, such jacket communicating to the interior of the respective manhole or catch basin through one or more courses of cored brick adjacent the cover.

In locations adjacent buildings, or where the concentration of methane is such that it would be dangerous to vent the gases through the catch basin or manhole covers, the gases may be vented through vertical vent pipes or risers extending from the crushed stone layers in the utility line trenches through the pavement and, if adjacent any building, extending above the roofline of such building. Alternatively, the gases may be conducted into the cellars of the adjacent buildings where they may be burned in equipment used to heat or air-condition the buildings, or to heat water for such buildings, thereby enhancing the quality of the air in the vicinity of the landfill.

BRIEF DESCRIPTION OF THE DRAWINGS

For a better understanding of the invention, reference may be had to the following description of exemplary embodiments taken in conjunction with the figures of the accompanying drawings in which.

DESCRIPTION OF THE PREFERRED EMBODIMENTS

Figure 1:
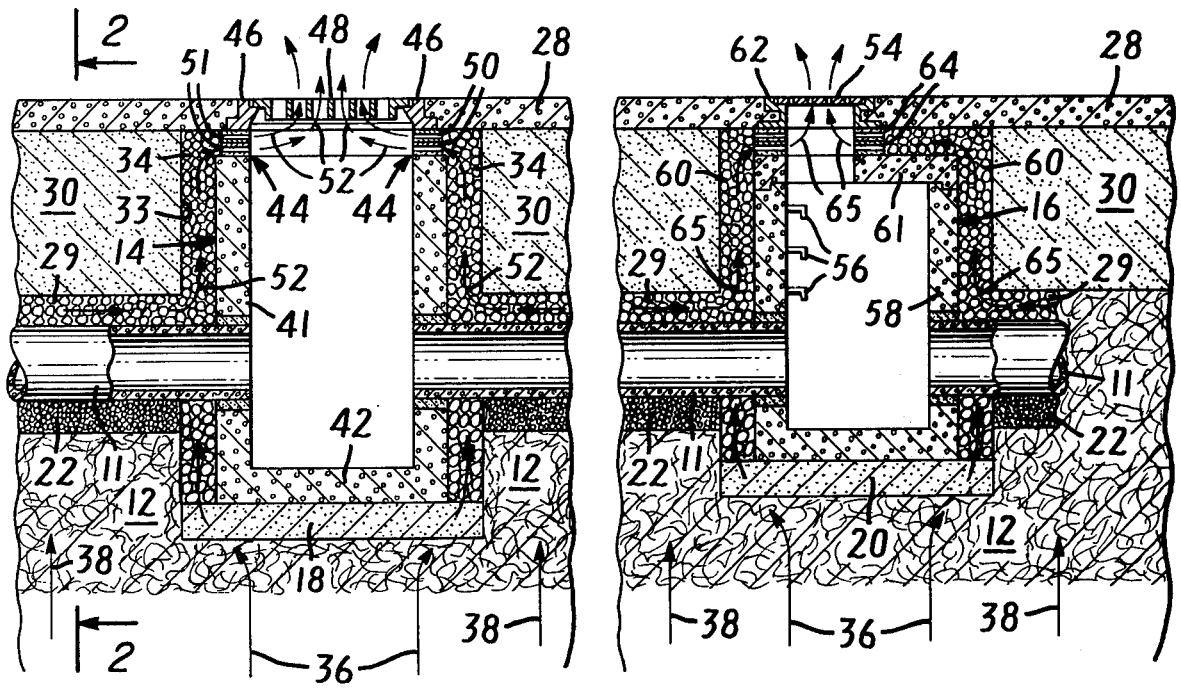
FIG. 1 is a view in longitudinal section of a gas migration control system according to the invention.
Figure 2:
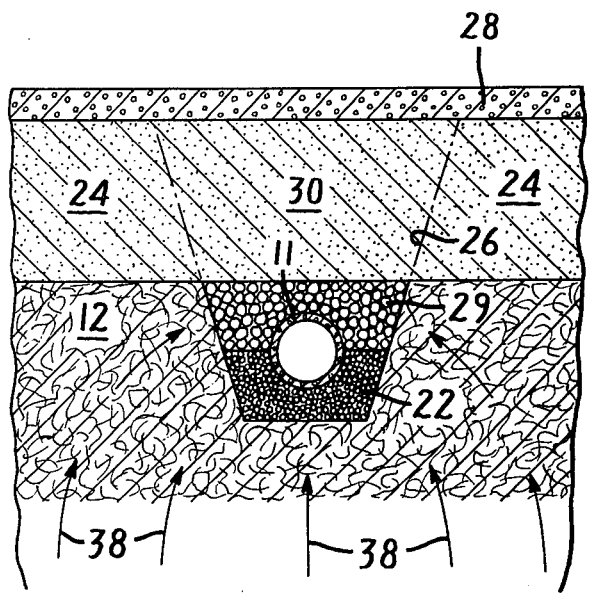
FIG. 2 is a view taken along the line 2—2 of FIG. 1 and looking in the direction of the arrows.

In the representative embodiment of the invention shown by way of example in FIGS. 1 and 2, a conventional utility system, such as a storm sewer, includes a horizontal conduit 11 of suitable diameter and of reinforced concrete, for example, which is disposed just below the top of a sanitary landfill 12. At appropriately spaced locations along the conduit 11 and communicating therewith are a plurality of catch basins 14 and manholes 16, which rest upon beddings 18 and 20, respectively, of sand. The conduit 11 rests upon a bedding 22 of crushed stone in the trench 26 (shown in phantom) constructed for laying the conduit, and a surcharge 24 of sand upon the refuse 12 supports a conventional pavement 28 of macadam, for example. The pavement preferably has a slight slope or grade, not detectable in FIG. 1, in order to promote the flow of surface water over the pavement and into the catch basins 14, from which the water flows through the conduit 11 into a main storm sewer line (not shown) and eventually discharges into a river, for example, as is well known to those skilled in the art.

If the surface above the landfill 12 includes a plurality of streets, for example, then preferably there would be a conduit 11 together with catch basins 14 and manholes 16, along each of these streets. On the other hand, if the pavement 28 extends over a large area such as a parking lot, then there would be a plurality of conduits 11 preferably generally parallel to each other and spaced apart appropriately so as to insure proper drainage for the parking lot.

In accordance with the invention, instead of backfilling the trench 26 with sand to the depth of the bedding 22, a blanket or layer 29 or crushed stone or coarse gravel, preferably of the size known as ASTM (American Society for Testing and Materials) No. 57, for example, is laid over the bedding 22 and the conduit 11 to a depth of about 1 foot (30 cm.), for example, and the remainder of the trenh 26 is back-filled with sand 30. The voids or interstices between the gravel in the blanket 29 provides a relatively permeable conduit through which decomposition gases generated in the landfill 12 may flow horizontally.

When back-filling the excavation for each catch basin 14, a space 33 is provided between the catch basin and the surcharge 24 and 30, and the space 33 is filled with stone or gravel, preferably size ASTM No. 57, so as to form surrounding each catch basin a jacket 34 that provides a relatively permeable vertical conduit for the decomposition gases, the jacket 34 being in communication with the blanket 29. Accordingly, the decomposition gases which are generated in the landfill 12 beneath the catch basins may flow upwardly as illustrated by the flow lines 36 through the jacket 34 adjacent the catch basins, while the gases generated in the portion of the landfill disposed laterally of the catch basins will flow as indicated by the flow lines 38 to the blanket 29 over the closest conduit 11, and thence horizontally to the closest catch basin 14.

Each catch basin 14 is formed of the usual reinforced concrete sidewall 41 and bottom 42, which are impermeable to water and gas. In accordance with the invention, there is provided an annular gas permeable wall segment 44 disposed between the sidewall 41 and the usual frame 46 that supports a conventional grate 48. The gas permeable wall 44 preferably comprises at least one course of cored bricks 50, each of the bricks 50 being formed with a plurality of core holes 51 therethrough of approximately three-quarter inch in diameter, for example, to enable the decomposition gases rising through the jacket 34 to pass laterally through the bricks and thence upwardly through the grate 48 and into the atmosphere, as shown by the flow lines 52.

Spaced at appropriate intervals along the conduit 11, the manholes 16 enable a person to inspect and clean the conduit 11, by removing the usual cover 54 and descending by means of the steps 56, which are embedded in the reinforced concrete sidewall 58 of the manhole. A jacket 60 surrounding the lateral wall 58 contains coarse gravel or crushed stone, preferably size ASTM No. 57, so as to provide a gas permeable passageway in communication with the blanket 29 above, and the bedding 22 below, the conduit 11. Between the reinforced concrete top slab 61 and the conventional cover frame 62 is at least one course of cored bricks 64, so that decomposition gases from the landfill 12 pass horizontally through the blanket 29, vertically through the jacket 60, laterally through the bricks 64 and thence vertically through the holes in the cover 54 and into the atmosphere, as shown by the flow lines 65.

Figure 3:
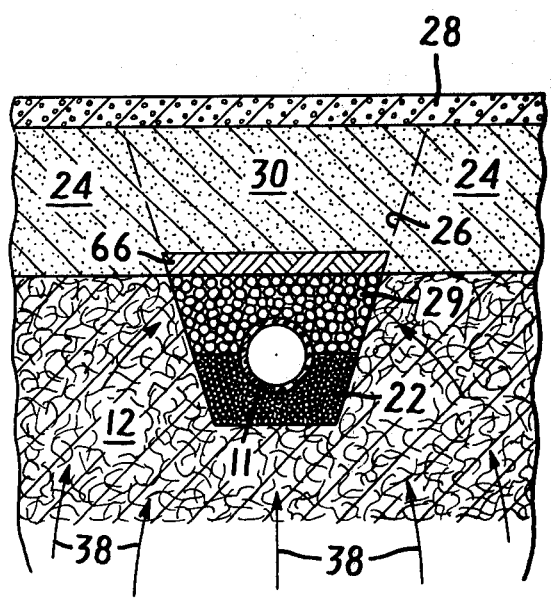
FIG. 3 is a cross-sectional view similar to that of FIG. 2, showing another embodiment of the invention.

FIG. 3 shows a cross section of a utility trench in accordance with another embodiment of the invention, in which a layer 66 of several inches, for example, of clay or other relatively impermeable material is laid immediately above the gas permeable blanket 29. The impermeable layer 66 insures that the gases flowing through the blanket 29 are vented to the atmosphere through the catch basins 14 and the manholes 16 and do not cause cracks in the pavement 28 above the trench 26, which might otherwise occur if there is a relatively heavy flow of gases through the blanket 29. The formation of such pavement cracks would necessitate frequent repair and would also result in the venting of the decomposition gases through large areas of the pavement, which might be undesirable or unsafe.

Figure 4:
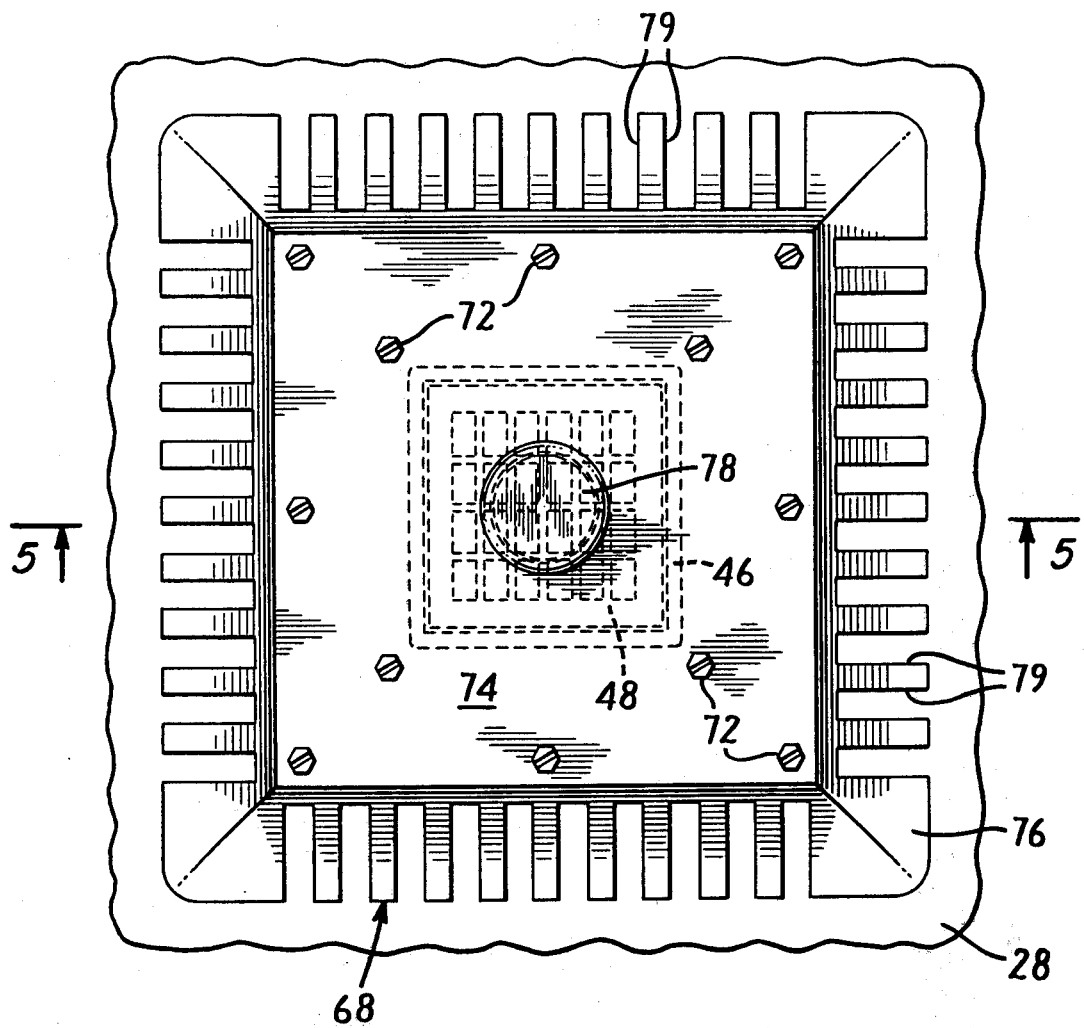
FIG. 4 is a plan view of a cover for a catch basin for promoting the dispersion of gases vented therethrough.
Figure 5:
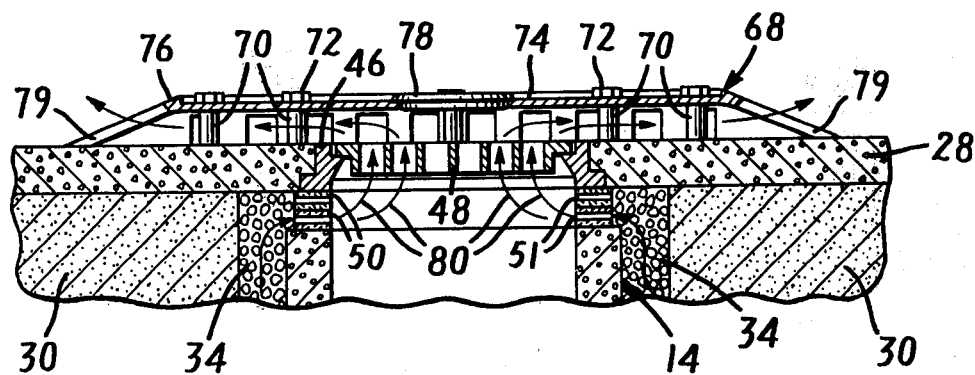
FIG. 5 is a view taken along the line 5—5 of FIG. 4 and looking in the direction of the arrows.

FIGS. 4 and 5 show an arrangement for diffusing the gases emitted through a catch basin so as to reduce the gas concentration and thus minimize the danger where the gases are emitted in parking lots, playgrounds and streets, for example. A steel cover 68 is mounted on a plurality of posts 70 by a plurality of screws 72 in adjacent spaced relation above the surface of the pavement 28 and above the grate 48 of the catch basin 14. The cover 68 includes a central flat portion 74 that is disposed over the grate 48 and a peripheral portion 76 that extends laterally beyond the periphery of the grate. The flat portion 74 includes a removable cover 78 in order to provide access to the grate 48 for inspection and cleaning. The peripheral portion 76 slopes outwardly downwardly from the central flat portion 74 to the pavement 28 and is formed with a plurality of apertures 79 that enable the ground water flowing over the pavement to flow into the catch basin 14, while permitting the decomposition gases from the jacket 34 and cored bricks 50 to flow upwardly through the grate 48, laterally outwardly between the pavement 28 and the cover 68, and upwardly through the apertures 79 to the atmosphere, as shown by the flow lines 80.

Figure 6:
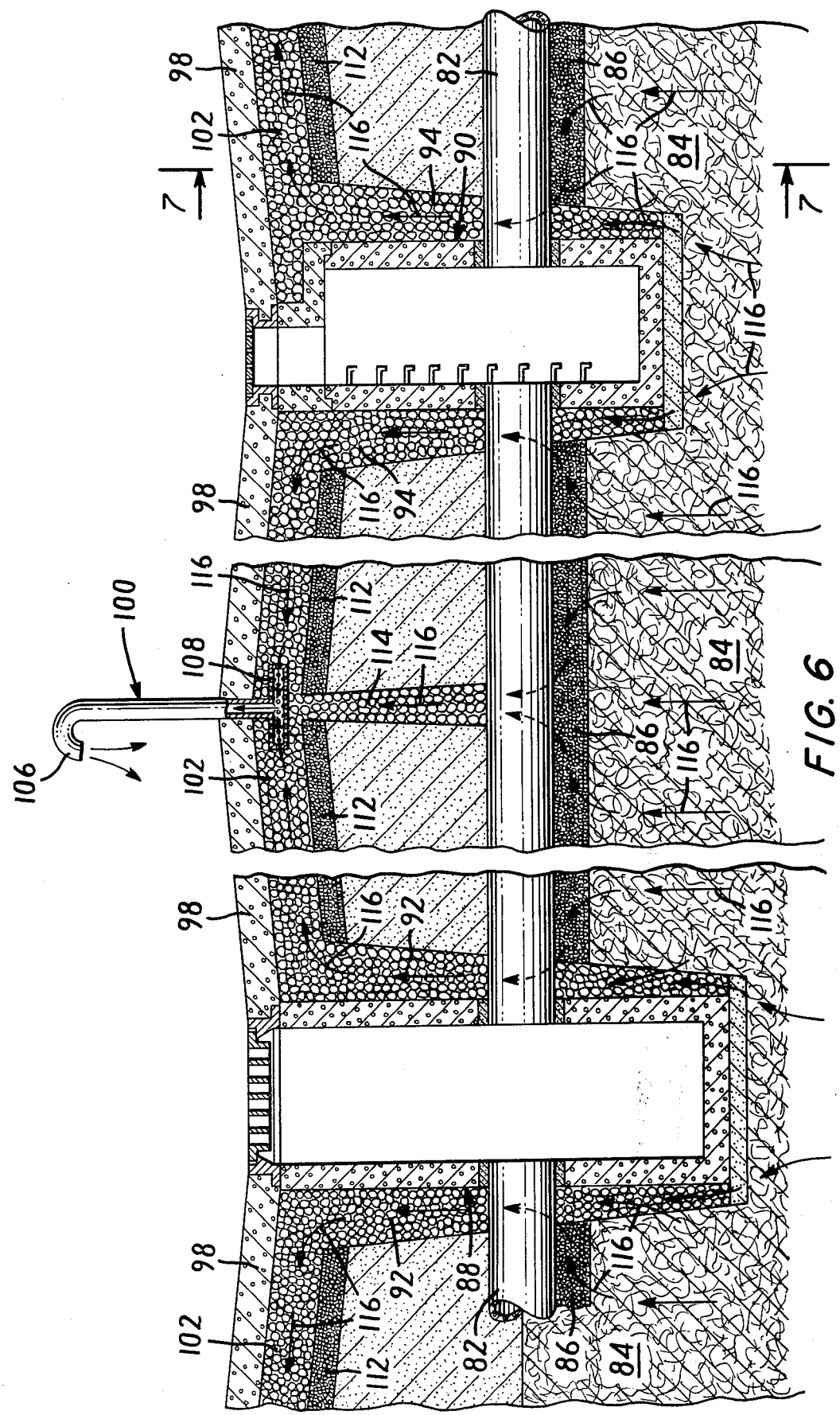
FIG. 6 is a view in longitudinal section of another system for controlling gas migration in accordance with the invention.
Figure 7:
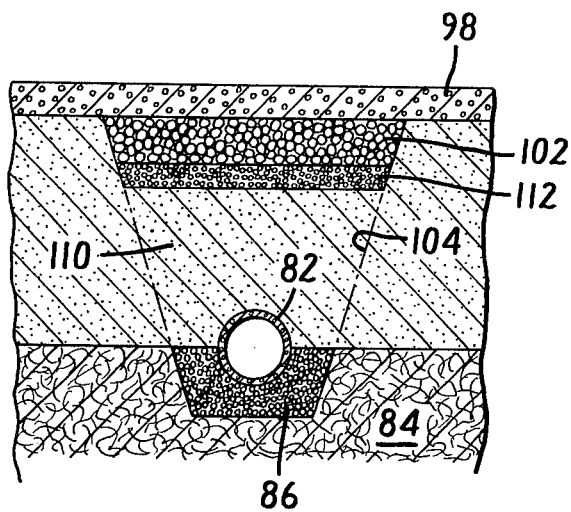
FIG. 7 is a view taken along the line 7—7 of FIG. 6 and looking in the direction of the arrows.

FIGS. 6 and 7 show another system for controlling gas movement in a refuse fill. The conventional conduit 82 of a storm sewer system, for example, is disposed at the top of the refuse 84 and rests on the usual bedding 86 of crushed stone. Spaced at appropriate intervals along the conduit 82 are a plurality of catch basins 88 and manholes 90 in communication therewith. Jackets 92 and 94 are provided around the lateral walls of the catch basins 88 and the manholes 90, respectively, and these jackets are preferably composed of size ASTM No. 57 stone or gravel and provide relatively permeable vertical passageways through which the gases generated in the refuse may rise. In the arrangement of FIGS. 6 and 7, however, these gases are not vented to the atmosphere through the catch basin grates and the manhole covers, inasmuch as it is assumed that the amount of methane generated in the fill 84 is such that a dangerous condition would be caused. Rather, the gases are conducted laterally just beneath the pavement 98 to a plurality of risers or vent pipes 100, which extend through the pavement 98. To this end, the decomposition gases flow horizontally through a relatively permeable layer 102, preferably of size ASTM No. 57 stone, which is deposited at the top of the trench 104 that is excavated for the conduit 82.

Each riser 100 preferably extends about 25 feet above the pavement 98, in order that the methane vented therethrough cause no danger to people or vehicles on the pavement. The upward end of the riser is bent over in an inverted U-shape at 106 in order to prevent rain water from entering the riser, and the lower end of the riser in the layer 102 communicates with a short horizontal section of perforated pipe 108 at the center thereof in order to promote the flow of gases from the layer 102 into the riser 100.

Between the conduit 82 and the bedding 86, and the gas permeable layer 102, the trench 104 is back-filled with sand at 110, there being a layer 112 of crushed stone disposed between the permeable layer 102 and the sand 110, the crushed stone layer 112 preventing the sand from infiltrating into the permeable layer 102 and plugging the interstices therein.

At appropriate intervals along the conduit 82, for example every fifty feet, there are formed in the trench 104 a plurality of vertical gas permeable passageways 114 communicating the bedding 86 beneath the conduit 82 with the horizontal permeable passageway 102 just beneath the pavement 98. The passageways 114 are preferably composed of size ASTM No. 57 stone. Inasmuch as sand is cheaper than No. 57 stone, the system according to FIGS. 6 and 7 is considerably cheaper than a system in which the entire trench 104 were filled with No. 57 stone between the bedding 86 and the pavement 98, and yet the illustrated system is effective in safely controlling and dispersing the decomposition gases generated in the fill 84. These gases flow upwardly through the jackets 92 and 94 surrounding the catch basins 88 and the manholes 90, respectively, and through the vertical passageways 114 therebetween to the horizontal passageway 102 disposed just below the pavement 98. The gases then flow horizontally through the passageway 102 to the nearest riser 100, through which they are vented to the atmosphere. Such gas flow is shown by the flow lines 116.

The pavement 98 is typically crowned or sloped in order to facilitate the flow of ground water into the catch basins 88, and the risers 100 are preferably located at the peaks of such crowns in order that the gas flow through the generally horizontal passageway 102 may flow upwardly toward the risers.

In order to limit the number of obstructions extending above the pavement 98, the risers 100 are preferably located adjacent fire hydrants, street lights, and the like, thereby also limiting the number of barriers which might be required in order to protect such fire hydrants, lights etc. from vehicles. The street lights may even be constructed so as to include the risers 100 therein.

If the pavement and base 98 should be less than 12 inches, for example, it might be weakened by the No. 57 stone in the passageway 102 immediately thereunder. Under such conditions, an additional layer of crushed stone several inches thick similar to that in the layer 112 could be deposited between the layer 102 and the pavement 98 to act as a buffer therebetween.

Figure 8:
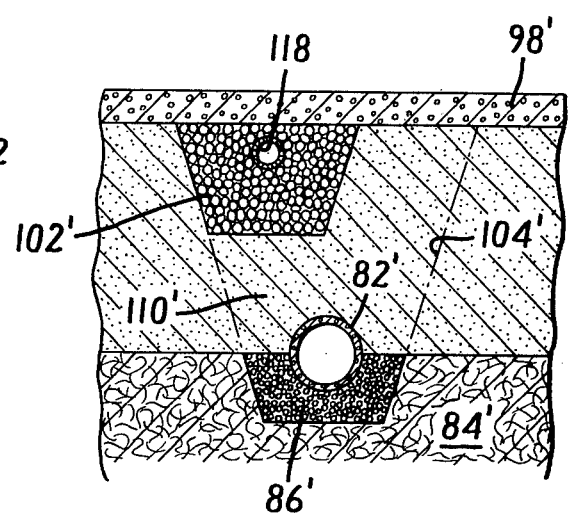
FIG. 8 is a view in cross section similar to that of FIG. 7 but showing still another embodiment of the invention.

FIG. 8 shows a cross section of another back-filled utility trench which might be used in the system according to FIG. 6. Corresponding elements are designated with the same reference numerals, primes being added to the elements in FIG. 8. In this arrangement, the gas permeable horizontal passageway 102' is also immediately adjacent the pavement 98' and is spaced from the conduit 82' and bedding 86' by the sand blanket 110', and the horizontal passageway 102' is communicated with the bedding 86' through the catch basin jackets, the manhole jackets and the vertical passageways (not shown in FIG. 8). The gas permeable passageway 102' does not extend across the full width of the trench 104', although its depth is increased as compared to the depth of the passageway 102 in FIG. 7, so that the cross-sectional area of the passageway 102' is about the same as that of the passageway 102.

A perforated pipe 118 extends throughout the length of the passageway 102' in the upper central portion thereof in order to enhance the gas conducting capability of the passageway 102'. A perforated pipe is also preferably placed in the jacket surrounding each catch basin and manhole just beneath the pavement, the perforated pipe surrounding each such catch basin and manhole being connected with the perforated pipe 118.

Figure 9:
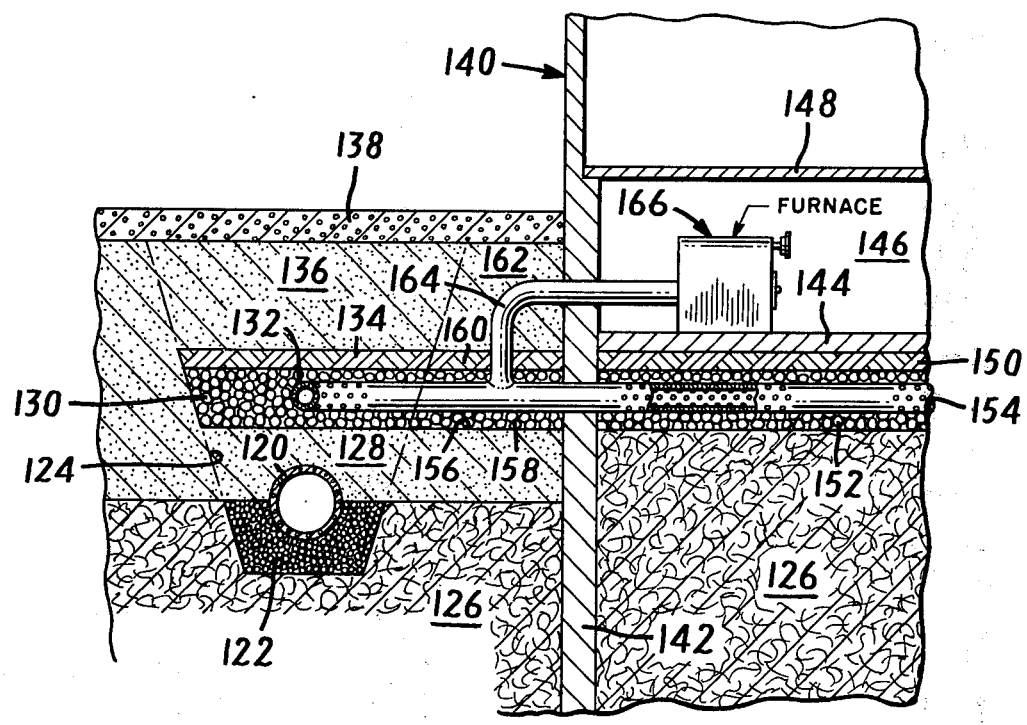
FIG. 9 is a cross-sectional view of yet another embodiment of the invention, showing means for conducting the decomposition gases from a landfill to a furnace in the cellar of a building constructed on the landfill.

FIG. 9 shows a cross-sectional view of a back-filled utility trench according to another embodiment of the invention. A conduit 120, which may be part of a conventional storm drain system, or may be used to supply water under pressure for domestic and/or commercial users, rests upon the usual bedding 122 of crushed stone. The trench 124, which is excavated in a landfill 126, is back-filled over the conduit 120 and the bedding 122 with a layer of sand 128, above which is deposited a gas permeable layer 130, which preferably is composed of size ASTM No. 57 stone, through the interstices therebetween flow the gases generated by the landfill 126.

At appropriate intervals along the conduit 120 are provided a plurality of vertical passageways extending between the bedding 122 and the gas permeable layer 130, such vertical passageways (not shown in FIG. 9) preferably being composed of size ASTM No. 57 stone, similar to the vertical passageways 114 in FIG. 6, whereby the gases generated in the landfill 126 will flow upwardly into the bedding 122, thence horizontally therethrough to the nearest vertical passageway, and then upwardly to the gas permeable layer 130.

Horizontal movement of the gases through the layer 130 is promoted by a perforated pipe 132, which is preferably disposed in the upper central portion of the layer 130, and generally parallel to the conduit 120. A relatively impermeable layer 134, preferably of clay, is deposited immediately above the permeable layer 130, and the remaining portion of the trench 124 is back-filled with sand 136 between the impermeable layer 134 and the conventional pavement 138.

The utility trench 124 runs adjacent to a building 140, which includes the usual foundation 142, slab 144, cellar 146 and floor 148. In order to prevent a dangerous concentration of methane from entering the cellar 146 through cracks or other imperfections in the slab 144 from the landfill 126 immediately therebelow, a gas impermeable layer 150, preferably of clay, is deposited immediately below the slab 144, and a relatively permeable layer 152, preferably of size ASTM No. 57 stone, is provided between the impermeable layer 150 and the landfill. Horizontal movement of the gases generated in the landfill below the building 140 through the permeable layer 152 is promoted by a perforated pipe 154 therein, the pipe 154 extending through the foundation 142, so as to conduct the gases in the permeable layer 152 away from the building 140.

The perforated pipe 154 extends into the utility trench 124 and connects with the perforated pipe 132, and a transverse trench 156, which is excavated between the foundation 142 and the utility trench 124, is back-filled with size ASTM No. 57 stone so as to provide a permeable layer 158 in the trench 156 surrounding the perforated pipe 154, in general registry with the permeable layers 130 and 152.

A gas impermeable layer 160, preferably of clay, is deposited in the transverse trench 156 over the permeable passageway 158 and in general registry with the impermeable layers 134 and 150, and the remaining portion of the trench 156 is back-filled with sand 162 between the impermeable layer 160 and the pavement 138.

The decomposition gases from the landfill 126 flow horizontally through the perforated pipe 154 and the permeable layers 152 and 158 from beneath the building 140, and also flow horizontally from the permeable layer 130 (and the perforated pipe 132) in the back-filled utility trench 124, and these gases are conducted upwardly through a solid pipe 164, which is connected to the perforated pipe 154 and extends upwardly through the impermeable layer 160 adjacent the foundation 142. The solid pipe 164 extends through the foundation 42 into the cellar 146, where it supplies the methane and other decomposition gases to a conventional furnace 166. Accordingly, the potentially dangerous methane generated in the landfill 126 beneath and in the vicinity of the building 140 is used to heat the building, thereby making it unnecessary to vent these gases to the atmosphere in the vicinity of the building. Accordingly, by avoiding the direct discharge of methane and other decomposition gases into the atmosphere, the quality of the air in the vicinity of the landfill is improved.

While the fundamental novel features of the invention have been shown and described, it will be understood that various substitutions, changes and modifications in the form and details of the systems illustrated may be made by those skilled in the art without departing from the spirit and scope of the invention. For example, utility trenches for storm sewer systems or for water supply may be back-filled in accordance with the systems illustrated in FIGS. 2 and 3 in order to vent the decomposition gases to the atmosphere through a plurality of risers (as illustrated in FIG. 6) or to burn these gases in a furnace to heat a building (as in FIG. 9). Similarly, the systems illustrated in FIGS. 7, 8 and 9 could be used for venting th gases to the atmosphere through catch basin grates and manhole covers as shown in FIG. 1. All such variations and modifications, therefore, are included within the scope of the invention as defined by the following claims.

I claim:

1. A system for controlling gas migration in a landfill into which extends at least one substantially vertical conduit having impermeable walls connected to a substantially horizontal conduit of a utility system, the vertical conduit communicating with the atmosphere through an aperture in a pavemennt overlying the landfill, comprising means forming a space surrounding the vertical conduit and extending from the pavement into the landfill, a gas permeable medium in the vertical conduit surrounding space, and gas permeable conduit forming means disposed between the vertical conduit and the pavement communicating the vertical conduit with the aperture in the pavement, whereby gases from the landfill flow through the gas permeable medium and the gas permeable conduit forming means into the atmosphere.

2. The system according to claim 1 wherein the gas permeable medium includes crushed stone.

3. The system according to claim 1 wherein the gas permeable conduit forming means includes at least one course of gas permeable bricks.

4. The system according to claim 1 wherein the utility system is a storm sewer system, and also including a cover for the aperture in the pavement, at least the central portion of the cover being impermeable, the cover being spaced above the pavement and the periphery of the cover extending laterally beyond the periphery of the aperture, so that gases from the gas permeable conduit forming means flow upwardly through the aperture in the pavement and outwardly between the pavement and the cover, the gases being vented to the atmosphere through a zone having a perimeter greater than the perimeter of the aperture, and surface water flowing inwardly between the pavement and the cover and downwardly through the aperture in the pavement.

5. The system according to claim 4 wherein the cover includes a central impermeable substantially flat portion, and a peripheral portion sloping outwardly and downwardly from the central portion to the pavement, the periphery of the central portion being disposed laterally beyond the periphery of the aperture, the peripheral portion including a plurality of apertures for venting the gases to the atmosphere.

6. The system according to claim 1, also including means forming a space adjacent the horizontal conduit, the horizontal conduit adjacent space communicating with the vertical conduit surrounding space, and a gas permeable medium in the horizontal conduit adjacent space, whereby gases from the landfill flow laterally through the gas permeable medium adjacent the horizontal conduit to the space surrounding the vertical conduit and then flow upwardly through the gas permeable medium surrounding the vertical conduit and through the gas permeable conduit forming means into the atmosphere.

7. The system according to claim 6, also including a gas impermeable barrier disposed between the pavement and the gas permeable medium adjacent the horizontal conduit.

8. The system according to claim 7, wherein the gas permeable medium includes crushed stone.

9. A system for controlling gas migration in a landfill over which extends at least one substantially horizontal conduit of a utility system, comprising means forming a space extending generally parallel with the horizontal conduit, a gas permeable medium in the space parallel with the horizontal conduit, and conduit means for conducting gases away from the space parallel with the horizontal conduit.

10. The system according to claim 9, wherein a pavement overlies the landfill, and the conduit means extends from the space parallel with the horizontal conduit through the pavement so as to vent the gases from the landfill to the atmosphere.

11. The system according to claim 10, wherein the horizontal conduit communicates with at least one substantially vertical conduit having impermeable walls, and also including means forming a space surrounding the vertical conduit, the vertical conduit surrounding space communicating with the space parallel with the horizontal conduit, and a gas permeable medium in the vertical conduit surrounding space, whereby gases from the landfill flow upwardly through the gas permeable medium surrounding the vertical conduit and then flow laterally through the gas permeable medium parallel with the horizontal conduit to the conduit means extending through the pavement.

12. The system according to claim 9, wherein the gas permeable medium parallel with the horizontal conduit and from which the conduit means conducts gases is spaced from the horizontal conduit, and also including means forming substantially vertical passageways extending between the horizontal conduit and the gas permeable medium parallel therewith at spaced locations along the horizontal conduit, and a gas permeable medium in the vertical passageways, whereby gases from the landfill flow upwardly through the gas permeable medium in the vertical passageways and then flow laterally through the gas permeable medium parallel with the horizontal conduit to the gas conducting conduit means.

13. The system according to claim 9, also including perforated conduit means disposed in the gas permeable medium parallel with the horizontal conduit and extending generally parallel therewith, the perforated conduit means communicating with the gas conducting conduit means.

14. The system according to claim 9, wherein a building is located adjacent the horizontal conduit and the building contains equipment including a burner, and the gas conducting conduit means communicates with the burner so as to feed the gases thereto.

15. The system according to claim 14, also including a gas impermeable barrier disposed above the gas permeable medium parallel with the horizontal conduit.

16. The system according to claim 14, also including means forming a space beneath the building, a gas permeable medium in the space beneath the building, and conduit means communicating the gas permeable medium beneath the building with the gas conducting conduit means, whereby the gases beneath the building flow through the gas permeable medium beneath the building and through the communicating conduit means to the gas conducting conduit means and thence to the burner.

17. The system according to claim 16, also including a gas impermeable barrier disposed between the building and the gas permeable medium beneath the building.

* * * * *